(12) United States Patent
Nihoshi

(10) Patent No.: US 6,188,515 B1
(45) Date of Patent: Feb. 13, 2001

(54) VARIABLE-INCLINATION-ANGLE LENS-BARREL FOR MICROSCOPES AND MICROSCOPE SYSTEM

(75) Inventor: Toshiaki Nihoshi, Yokohama (JP)

(73) Assignee: Nikon Corporation, Tokyo (JP)

(*) Notice: Under 35 U.S.C. 154(b), the term of this patent shall be extended for 0 days.

(21) Appl. No.: 09/378,345

(22) Filed: Aug. 20, 1999

Related U.S. Application Data

(63) Continuation of application No. 08/969,189, filed on Nov. 13, 1997, now abandoned.

(30) Foreign Application Priority Data

Nov. 15, 1996 (JP) .................................................. 8-305299

(51) Int. Cl.$^7$ ............................. G02B 21/00; G02B 21/20
(52) U.S. Cl. ............................ 359/384; 359/375; 359/431
(58) Field of Search .................................... 359/362–365, 359/368, 744, 375–384, 676–677, 689–690, 431, 434

(56) References Cited

U.S. PATENT DOCUMENTS

| | | | |
|---|---|---|---|
| 3,459,464 | * 8/1969 | Smith | 359/380 |
| 4,175,826 | * 11/1979 | Blaha et al. | 359/384 |
| 4,204,748 | * 5/1980 | Yonekubo | 359/432 |
| 4,299,439 | * 11/1981 | Stromblad | 359/384 |
| 4,412,727 | * 11/1983 | Taira | 359/384 |
| 4,576,450 | * 3/1986 | Westphal | 359/384 |
| 4,643,541 | * 2/1987 | Matsubara | 359/384 |
| 4,691,997 | * 9/1987 | Muchel | 359/384 |
| 5,532,872 | * 7/1996 | Sakamoto et al. | 359/384 |
| 5,589,977 | * 12/1996 | Lucke et al. | 359/375 |
| 5,657,158 | * 8/1997 | Baumann et al. | 359/384 |

FOREIGN PATENT DOCUMENTS

3105018 * 9/1982 (DE) ....................................... 359/384

* cited by examiner

Primary Examiner—Thong Nguyen
(74) Attorney, Agent, or Firm—Anderson, Kill & Olick, P.C.

(57) ABSTRACT

A lens system for a microscope having a variable angle lens-barrel. The lens-barrel includes an afocal optical system lying along an optical path extending from an infinite correction type objective lens to an ocular lens and comprises a first lens group which has positive refractive power, a second lens group which has negative refractive power, and a third lens group which has positive refractive power. The lens system includes a reflective mirror positioned between the second lens group and the third lens group which is mounted for rotation a out a pendular axis. Light through the infinite correction type objective lens becomes a parallel light beam which is passed to the third lens group from the reflective mirror.

4 Claims, 1 Drawing Sheet

VARIABLE-INCLINATION-ANGLE LENS-BARREL FOR MICROSCOPES AND MICROSCOPE SYSTEM

This application is a Continuation of the U.S. application, Ser. No. 08/969,189, filed on Nov. 13, 1997, now abandoned.

FIELD OF THE INVENTION

The present invention relates to a microscope system in which a barrel on the ocular lens end of the microscope is slanted in relation to a barrel on the objective lens end. More specifically, it refers to a variable inclination angle lens barrel for a microscope and microscope system in which the slanting angle and the like of the barrel on the ocular lens end of the microscope is adjustable.

BACKGROUND OF THE INVENTION

In microscopic observation, from the point of view of ergonomics, it is preferred that one perform an observation with maximum comfort. Therefore, it is conventional in many microscopes for the slanting angle (depression angle) of the barrel on the ocular lens end of the microscope to be variable. This feature of a microscopes in which the slanting angle of the barrel on the ocular lens end is variable is disclosed in Japanese Laid-Open Patent Sho. 57-20714, Japanese Laid-Open Patent Sho. 61-15116, Japanese Laid-Open Patent Sho. 61-294408, Japanese Laid-Open Patent Hei. 4-179909 and U.S. Pat. No. 4,299,439.

Also, Japanese Laid-Open Utility Model Sho. 59-121607 shows an example of a microscope in which the height of the eye piece section of an ocular lens, that is, the height of eye point is adjustable. In addition, Japanese Laid-Open Patent Sho. 59-159119 shows a microscope with a structure in which the slanting angle, height and depth of the ocular lens are adjustable.

If the slanting angle of the barrel on the ocular lens end is adjustable, as described above, it is possible to provide a comfortable posture for an observer by adjusting the slanting angle to the direction in which the observer looks into the ocular lens. However, this adjustment of the slanting angle is not satisfactory. The position of the eye point is desired to be freely adjustable. Furthermore, adjustability in the position of the eye point provides a comfortable posture for an observer. Nonetheless, it is a problem that this adjustment is not satisfactory by itself.

In the case of the microscope published in Japanese Laid-Open Patent Sho. 59-159119, the slanting angle, height of the ocular lens and depth are all adjustable to satisfy the request for a comfortable posture for observation. To accomplish this the microscope employs a complex structure with a plurality of links which is unwieldy, complex, costly and of increasing size.

SUMMARY OF THE INVENTION

The present invention provides a variable-inclination-angle lens-barrel for guiding light through an optical path in a microscope extending from an infinite correction type objective lens group at one end of the microscope to an eyepiece at the other end. The invention permits the microscope to be of a simple structure which enables adjustment of the slanting angle of the ocular lens barrel and the corresponding distance of an eyepiece.

For the above purposes, the present invention provides a microscope structure having a lens-barrel and an optical path extending from an infinite correction type objective lens to an ocular lens, said microscope structure comprising:
 a first lens group which has positive refractive power;
 a second lens group which has negative refractive power; and
 a third lens group which has positive refractive power;
wherein:
 the first lens group and the second lens group together form an afocal system;
 a first reflective member positioned between the second lens group and the third lens group and which is mounted on a pendular axis; and
 at least one second reflective member positioned between the first lens group and the second lens group;
 said optical path comprises a first optical path extending from said objective lens group through said first and second lens group to said first reflective member and a second optical path extending from said first reflective member through said third lens group to said eyepiece;
 with the position of said first reflective member being rotatable about said pendular axis relative to said second optical path and with said pendular axis passing through said first reflective member at the intersection of the first and second optical path and being perpendicular to the optical axis of said first and second optical path; and
 with the third lens group being mounted for rotary motion about said pendular axis in common with the rotation of said first reflective member and with said distance between said first reflective member and said third lens group being adjustable.

The pendular axis passes through the point on the first reflective member where the optical axis of the optical path enters and is perpendicular to the optical axis of the first optical path and the optical axis of the second optical path.

In this microscope, the slanting angle of the ocular lens barrel is arbitrarily adjustable by pendulating a second optical path which extends through a second lens barrel and the ocular lens around a pendular axis in relation to a first optical path which includes the infinite correction type objective lens. Furthermore, the distance (depth) between the optical axis of the objective lens and the ocular lens (or eye point) is adjustable by varying the distance along the second optical path between a first reflective member and a third lens group of the ocular lens barrel.

Also, the first lens group and the second lens group are in an afocal arrangement so that the parallel light beam, which enters the microscope from an objective lens of the infinite correction type passes into the first lens group, remains as a parallel light beam as it passes between the second lens group and the third lens group. Therefore, adjusting the distance between the first reflective member and the third lens group will not affect an image which is imaged by the third lens group so that this adjustment is performed without restrictions.

It is preferable to construct the microscope such that a second reflective member, which performs an odd number of reflections, is located on the optical path extending from the objective lens of the infinite correction type. With this arrangement the first and second reflective member will, in concert, perform an even number of reflections so that an inverted image of an observed object is observed via the ocular lens. As a result, it is possible to observe the inverted image in the same manner as with a conventional microscope without it being different from the usual.

When the second lens barrel which lies in the second optical path is pendulated by a given angle α in relation to the first reflective member which reflects the light beam from the first optical path into the second optical path, it is preferable for the microscope to be configured such that the first reflective member pendulates around the pendular axis about which the second lens barrel pendulates but by an angle which is half of the given angle (α); i.e., by an angle of α/2 and in the same direction. This causes the first reflective member to be automatically pendulated by a desired and necessary angle when the second reflective member group is pendulated. As a result, an extra step of adjusting the angle of the first reflective member can be omitted.

Additionally, it is preferable for the microscope to be configured such that the distance between the infinite correction type objective lens in the first lens barrel and the first lens group along the first optical axis to be expandable. This enables the variable-inclination-angle lens-barrel to be easily moved in the vertical direction so that the height of the eye point can be freely adjusted. Additionally, the light beam between the infinite correction type objective lens and the first lens group is also a parallel light beam, therefore, the above expansion and contraction does not affect imaging.

BRIEF DESCRIPTION OF THE DRAWING

The FIGURE is a schematic representation of the optical arrangement of the variable-angle lens-barrel of the present invention for use in a microscope.

DETAILED DESCRIPTION OF THE PREFERRED EMBODIMENT

Figure 1:
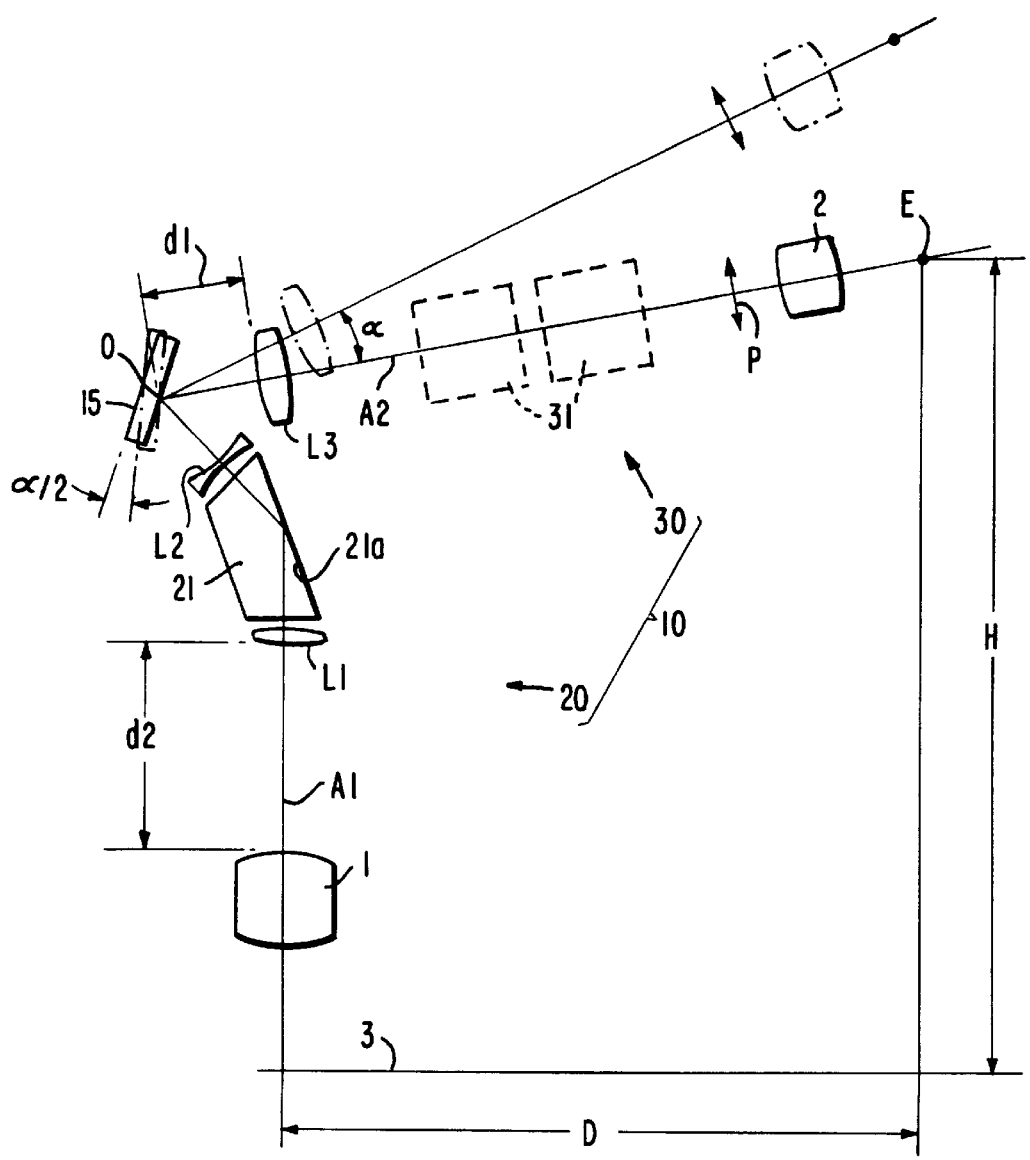

The following describes a preferred embodiment of the present invention in reference to the drawing. The FIGURE shows an optical system structure of a microscope containing the variable-angle lens-barrel of the present invention. The microscope consists of a lens-barrel 10 which comprises an objective lens group 1 and an ocular lens group 2. The lens-barrel 10 comprises a first lens-barrel 20, in which the objective lens group 1 is located, and a second lens-barrel 30, in which the ocular lens group 2 is located. The second lens-barrel 30 is arranged to pendulate around a pendular axis O (extending through the paper) which lies at the intersection on the optical path between the first lens-barrel 20 and the second lens-barrel 30.

Located inside the first lens-barrel 20 in the respective order from the end of objective lens group 1 is a first lens group L1 which has positive refractive power, reflective prism 21, and a second lens group L2 which has negative refractive power. On the other hand, the third lens group L3 which has positive refractive power and an optical path dividing prism group 31 located inside the second lens-barrel 30. This microscope is a binocular microscope, in which the ocular lens group 2 comprises a pair of lenses (right and left) which correspond to the right and left eyes and in which the optical path through the dividing prism 31 is divided into two parts passing respectively to the right and left lenses of the ocular lens group 2. A reflective mirror 15, which consists of a reflective surface, is mounted for pendular motion around the pendular axis O. The reflective mirror 15 is located such that its reflective surface intersects the pendular axis O on the optical path between the first lens-barrel 20 and the second lens-barrel 30. The pendular axis O passes through the reflective mirror 15 perpendicular to the optical axis through the second lens group L2 and the optical axis through the second lens-barrel 30.

In the microscope of the above structure, light from observation sample 3 enters reflective prism 21 via the first lens group L1 and is reflected from inner surface 21a of reflective prism 21 to the reflective mirror 15 via second lens group L2. The light is then reflected by reflective mirror 15 through the third lens group L3 from whence it is divided into two parts by the dividing prism group 31 and enters the right and left lenses of ocular lens group 2. This permits an enlarged image of observation sample 3 to be observed through an eyepiece at eye point E via ocular lens group 2.

Light from observation sample 3 is directed along an optical axis A1 of the first optical path which extends through the first lens-barrel 20 to the reflective mirror 15 as is shown in the FIGURE. On the other hand light reflected by reflective mirror 15 passes along an optical axis A2 of the second optical path extending through the second lens-barrel 30 to ocular lens group 2. The optical system herein is arranged such that the first optical path inclusive of the optical axis A1 and the second optical path inclusive of the optical axis A2 intersect each other at the pendular axis O. The second lens-barrel 30 is pendulous around pendular axis O which serves as the center between the first lens-barrel 20 and the second lens barrel 30. The second optical axis A2 which extends through the second lens barrel 30 is also pendulous around the pendular axis O.

Objective lens group 1 of the present microscope is of the infinite correction type such that light from observation sample 3 becomes a parallel light beam after passing objective lens group 1. On the other hand, first lens group L1 and second lens group L2, having a reflective prism 21 located in between them, forms a Galilean telescope, which is afocal. With this arrangement if the focal distances of the first lens group L1 and the second lens group L2 are represented by f1 and f2, respectively; then the telescope magnification (angular magnification) will be (f1/f2). Therefore, the parallel light beam which enters first lens group L1 via objective lens group 1 becomes a reduced parallel light beam, which is reduced by (f2/f1), and then passes through the second lens group L2 to the reflective mirror 15.

This parallel light beam is reflected by reflective mirror 15 to the third lens group L3 from whence it is imaged onto image surface P. In other words, third lens group L3 functions as an imaging lens. An enlarged image of observation sample 3 which is imaged onto imaging surface P is enlarged and observed via ocular lens group 2. During the observation, eye point E is located on optical axis A2 as indicated in the FIGURE.

As mentioned above, due to the fact that the second lens-barrel 30 is pendulous around the pendular axis O which extends through the reflective mirror 15 at the intersection of the optical path between the first lens-barrel 20 and the the second lens-barrel 30, the angle at which an observer looks into ocular lens group 2 (depression angle) can be adjusted according to the needs of the observer by pendulating second lens-barrel 30 (e.g. indicated by a two-dot chain line in FIG. 1). Consequently, height H of eye point E can be adjusted.

In order to perform the above pendulation, the second optical axis A2 is rotated by pendulating the second lens-barrel 30 in a relationship with the rotation of the reflective mirror 15 which allows reflective mirror 15 to pendulate by angle α/2 in the same direction in which second lens-barrel 30 is pendulated by angle α, as is shown in the FIGURE. For example, though not indicated in the FIGURE, the microscope can employ a gear assembly to determine (establish) an angular relationship between components such that preferably exactly half of the ratio of change in the rotation angle of the reflective mirror 15 occurs when pendulating the second lens-barrel 30 around the pendular axis O by the determined angle α and in the same direction. Additionally, the light which is reflected by reflective mirror 15 is a parallel light beam; therefore, as long as the accuracy of the pendulating angle is high, the position of the imaging surface P which is imaged by third lens group L3 is not affected by a deviation with respect to the position of reflective point O. As a result, construction of the above structure is simplified.

In the present microscope, furthermore, the extension or distance d1 between reflective mirror 15 and third lens group L3 in second lens-barrel 30 is adjustable. As mentioned above, the light beam through this portion of the optical path is a parallel light beam, thus, as long as the distance between the third lens group L3 and the ocular lens group 2 remains the same, there will be no change in the observed image even when distance d1 is adjusted. By adjusting this portion of the second lens-barrel 30, it is possible to adjust the depth D of eye point E (the horizontal distance between the optical axis of objective lens group 1 and eye point E).

In the microscope of this example, as described above, not only is the slanting angle of the second lens-barrel 30 (also the second optical axis A2) adjustable but the depth D of eye point E is also adjustable. Moreover, by adjusting these variables, height H of the eye point can also be adjusted. As a consequence, adjustability of observation postures is great to provide the most comfort for the observer.

Furthermore, in the microscope of this example the portion of the optical path between objective lens group 1 and first lens group L1 is a parallel light beam; therefore, the portion of first lens-barrel 20 corresponding to the above mentioned portion can be expanded in order to adjust the size d2 (as shown in the FIGURE) representing the distance between the objective lens group 1 and the first lens group L1. As a result, freedom in adjustability of height H of eye point increases.

In the microscope of this example, two reflective members (reflective prism 21 and reflective mirror 15) are located in the optical path between objective lens group 1 and ocular lens group 2 and as a result, the image of the observation sample is inverted twice. Accordingly, the image of the observation sample to be observed via ocular lens group 2 becomes an inverted image, which is identical to an observed image in a conventional microscope; thus, operation of the present microscope will be familiar to a user. In each embodiment of the present invention, the total number of reflective members located on the optical path between objective lens group 1 and ocular lens group 2 (or the number of reflections) must be an even number. Since reflective mirror 15 is essential, the reflective members should be arranged so that the number of reflections by other reflective members is an odd number.

As described above, according to the present invention, the slanting angle of the lens-barrel 10 of the microscope is arbitrarily adjustable by pendulating the second optical path members including the lens barrel 30 and the ocular lens 2 around the pendular axis O relative to the first optical path members including the first lens-barrel 20. Moreover, the distance (depth) between the optical axis A1 of the objective lens group 1 and the ocular lens group 2 (or the eye point E) can be adjusted by adjusting the distance between the first reflective member 15 and the third lens group L3 in the second lens barrel 30. By combining these two adjustments, the height H of the eye point E can be adjusted as well as the slanting angle of the ocular lens group 2 and the depth D of the eye point E. Overall, these adjustments provide much comfort for the observer.

The second reflective member 21 produces an odd number of reflections so that in combination with the reflective member 15 an even number of reflections is performed along the optical path from the observation sample 3 to the eyepiece. Consequently, the inverted image of an observed object observed via the ocular lens group 2 can be readily observed with a conventional microscope without it being different from what one would use normally.

Also, it is preferable in accordance with the present invention for the first reflective member 15 to be pendulated by half of the angle through which the members forming the second optical path inclusive of the second lens barrel 30 are pendulated, i.e., the reflective member 15 should be pendulated by given angle (α/2) in one direction around the pendular axis O at the same time when the member which forms the second optical path is pendulated by a given angle a around the pendular axis O relative to the members which form the first optical path inclusive of lens barrel 20. Accordingly, the first reflective member is automatically pendulated by a necessary angle when the second optical path is pendulated; thus, a separate adjustment for the angle of the first reflective member is unnecessary.

Additionally, it is preferable in accordance with the invention, to have a structure in which the distance between the infinite objective lens group 1 and the first lens group L1 along the first optical path is adjustable. Consequently, the whole lens-barrel can be easily moved in the vertical direction, and the height H of the eye point E can be freely adjusted.

The present invention should not be limited in its construction to the preferred embodiment as above described.

What is claimed is:

1. A lens system for a microscope having a lens barrel, an objective lens group, an ocular lens group and a reflective mirror which guides light passing into said objective lens group toward said ocular lens group, said objective lens group being of an infinite correction type such that light passing through said objective lens group from an observation sample becomes a parallel light beam; said lens system comprising:

an afocal optical system having a first lens group with positive refractive power through which the parallel light beam is injected, and a second lens group with negative reflective power adapted to receive the light beam from the first lens group; and further comprising:

a third lens group with positive refractive power interposed in said lens system at a position such that a light beam from said afocal optical system reflected from said reflective mirror forms an image on the object side of said ocular lens group wherein said afocal optical system further includes a reflective prism positioned between said first and second lens group.

2. A lens system as defined in claim 1 wherein the image formed by said third lens group from said reflective prism and said reflective mirror is an inverted image.

3. A lens system as defined in claim 1 wherein said afocal optical system reduces said parallel light beam by a fixed magnification.

4. A lens system as defined in claim 3 wherein said fixed magnification is f2/f1, where f1 is a focal distance of said first lens group and f2 is a focal distance of said second lens group.

* * * * *